United States Patent
Taniguchi

(10) Patent No.: US 8,706,034 B2
(45) Date of Patent: Apr. 22, 2014

(54) ON-VEHICLE INFORMATION PROCESSING APPARATUS AND METHOD

(75) Inventor: Shinichi Taniguchi, Miyoshi (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/028,499

(22) Filed: Feb. 16, 2011

(65) Prior Publication Data

US 2011/0136435 A1 Jun. 9, 2011

Related U.S. Application Data

(63) Continuation of application No. PCT/JP2009/052204, filed on Feb. 10, 2009.

(51) Int. Cl.
*H04B 7/00* (2006.01)

(52) U.S. Cl.
USPC ..... 455/41.2; 455/418; 455/426.1; 455/414.1

(58) Field of Classification Search
USPC .......................................... 455/41.2
See application file for complete search history.

(56) References Cited

U.S. PATENT DOCUMENTS

| | | | |
|---|---|---|---|
| 7,697,917 B2* | 4/2010 | Camp et al. .................... 455/345 |
| 2007/0111710 A1 | 5/2007 | Pietruszka et al. |
| 2008/0039018 A1* | 2/2008 | Kim .............................. 455/41.2 |
| 2009/0227207 A1* | 9/2009 | Rouffet ......................... 455/41.2 |
| 2009/0247151 A1* | 10/2009 | Kameyama ................ 455/426.1 |
| 2009/0325566 A1* | 12/2009 | Bell et al. ....................... 455/419 |
| 2010/0049528 A1* | 2/2010 | Zeinstra et al. ................ 704/275 |
| 2011/0053506 A1* | 3/2011 | Lemke et al. ................. 455/41.2 |
| 2011/0105097 A1* | 5/2011 | Tadayon et al. .............. 455/418 |

FOREIGN PATENT DOCUMENTS

| | | |
|---|---|---|
| CN | 1839639 A | 9/2006 |
| CN | 201166978 Y | 12/2008 |
| JP | 2001-239897 A | 9/2001 |
| JP | 2002-279298 A | 9/2002 |
| JP | 2002-368759 A | 12/2002 |
| JP | 2003-95040 A | 4/2003 |
| JP | 2004-345540 A | 12/2004 |
| JP | 2006-053620 A | 2/2006 |
| JP | 2006-323400 A | 11/2006 |
| JP | 2008-523745 A | 7/2008 |

* cited by examiner

*Primary Examiner* — David Bilodeau
(74) *Attorney, Agent, or Firm* — Kenyon & Kenyon LLP

(57) ABSTRACT

An on-vehicle information processing apparatus for implementing various functions in cooperation with a portable apparatus connected thereto in a cabin of a vehicle is disclosed. The on-vehicle information processing apparatus comprises: a communication device configured to communicate with the portable apparatus; and a screen generating device configured to generate an operation screen for the functions which can be implemented in cooperation with the portable apparatus. The screen generating device is configured to identify the functions which can be implemented in cooperation with the portable apparatus connected thereto via the communication device, based on information of the connected portable apparatus, and generate the operation screen which varies according to the identified available function or functions.

9 Claims, 4 Drawing Sheets

ON-VEHICLE INFORMATION PROCESSING APPARATUS AND METHOD

CROSS-REFERENCE TO RELATED APPLICATIONS

The present application is a U.S. continuation application filed under 35 U.S.C. 111 (a) and 356 (c) of PCT application JP2009/052204, filed Feb. 10, 2009. The foregoing application is hereby incorporated herein by reference.

TECHNICAL FIELD

The present invention is related to an on-vehicle information processing apparatus for implementing various functions in cooperation with a portable apparatus connected thereto in a cabin of a vehicle, etc.

BACKGROUND ART

JP 2001-239897 A discloses an on-vehicle information processing apparatus which is configured to exchange information via wireless communication based on Bluetooth (registered trade mark, the same holds true hereinafter) with an apparatus brought in to a cabin of a vehicle and having a Bluetooth communication function, such as a mobile phone, a microphone unit, a portable audio player, a mobile personal computer, a personal information apparatus, etc. According to this on-vehicle information processing apparatus, an initial menu representing functions such as a car navigation function, a car audio function, a communication function with an electronic apparatus with Bluetooth communication function, etc., is displayed on a display.

The portable apparatus which functions in cooperation with the on-vehicle information processing apparatus such as mentioned above includes various types of apparatus, such as a mobile phone, a PDA (personal digital assistant), a portable audio apparatus, etc. Further, the variety of the functions which can be implemented in cooperation with the on-vehicle information processing apparatus is increasing, such as a hands-free function, an audio function, and a telephone directory function. Further, even in the same category of a mobile phone, the available function varies depending on models. For example, some mobile phones have only the hands-free function as a function which can be implemented in cooperation with the on-vehicle information processing apparatus, while other mobile phones have the hands-free function and the audio function (i.e., the function for reproducing music, etc.).

On the other hand, it is desirable that the on-vehicle information processing apparatus has various functions so as to accommodate as wide variety of the portable apparatuses as possible, and can provide an operation screen for various functions correspondingly.

However, due to increase in variety of the portable apparatus, there may be a mismatch between functions in the portable apparatus and the functions in the on-vehicle information processing apparatus. Thus, if a constant operation screen which the on-vehicle information processing apparatus supplies is generated without considering the model or type of the portable apparatus connected thereto, a user may be confused. For example, if the operation screen corresponding to the hands-free function and the audio function is provided even though the portable apparatus having only the hands-free function is connected, such a situation occurs where a user can select the audio function outwardly but in fact the audio function is not implemented. Such a situation is not preferable because it causes confusion for the user.

SUMMARY OF INVENTION

Therefore, it is an object of the present invention to provide an on-vehicle information processing apparatus which can provide an appropriate operation screen according to an included function in a portable apparatus connected thereto, etc.

In order to achieve the aforementioned object, according to the first aspect of the present invention, an on-vehicle information processing apparatus for implementing various functions in cooperation with a portable apparatus connected thereto in a cabin of a vehicle is provided. The on-vehicle information processing apparatus comprises: a communication device configured to communicate with the portable apparatus; and a screen generating device is configured to generate an operation screen for the functions which can be implemented in cooperation with the portable apparatus. The screen generating device configured to identify the functions which can be implemented in cooperation with the portable apparatus connected thereto via the communication device, among various functions which can be implemented in cooperation with portable apparatuses, based on information of the connected portable apparatus, and generate the operation screen which varies according to the identified available function or functions.

According to the present invention, an on-vehicle information processing apparatus which can provide an appropriate operation screen according to an included function in a portable apparatus connected thereto can be obtained.

Figure 1:
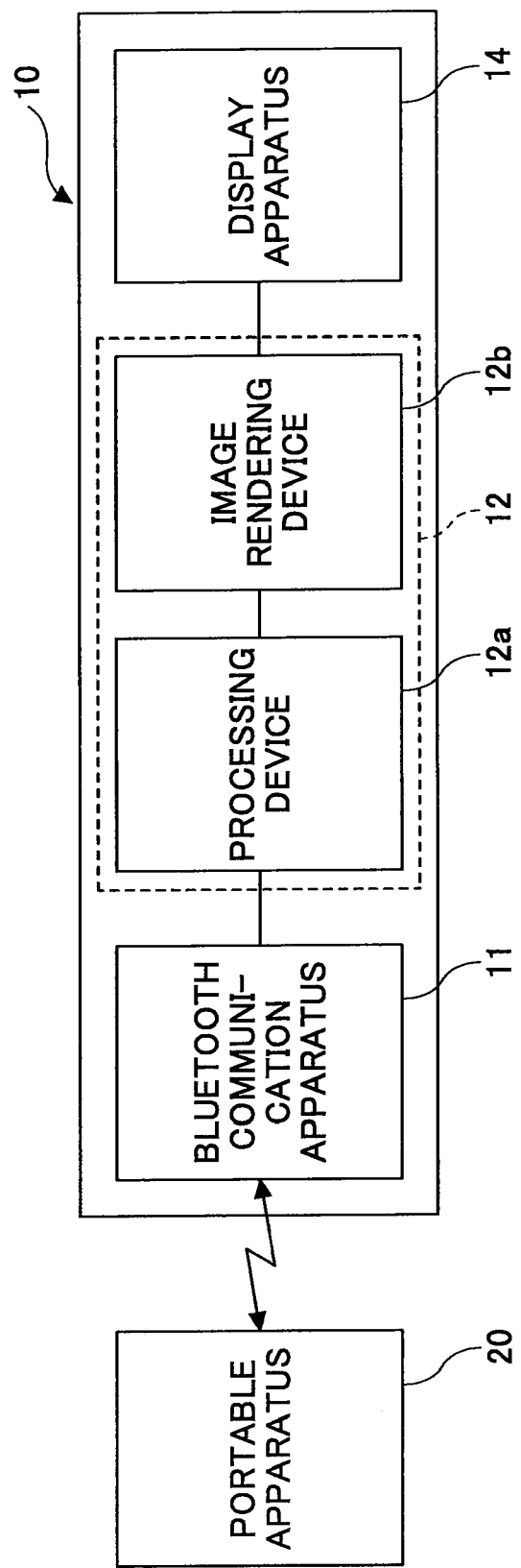
FIG. 1 is a diagram for illustrating a system as a whole including an embodiment of an on-vehicle information processing apparatus according to the present invention.

EXPLANATION FOR REFERENCE NUMBERS 10 on-vehicle information processing apparatus
11 Bluetooth communication apparatus
12 operation screen generating apparatus
12a processing device
12b image rendering device
14 display apparatus
20 portable apparatus
70a touch switch
70b touch switch
70c touch switch

BEST MODE FOR CARRYING OUT THE INVENTION

In the following, the best mode for carrying out the present invention will be described in detail by referring to the accompanying drawings.

FIG. 1 is a diagram showing a system as a whole including an embodiment of an on-vehicle information processing apparatus according to the present invention.

The on-vehicle information processing apparatus according to the embodiment is indicated by a reference numeral 10. The on-vehicle information processing apparatus 10 is installed on a vehicle. The on-vehicle information processing apparatus 10 includes, as main components, a Bluetooth communication apparatus 11, an operation screen generating apparatus 12 and a display apparatus 14, as shown in FIG. 1.

The Bluetooth communication apparatus 11 is configured to perform Bluetooth communication with a portable apparatus 20 which is to be brought in to a cabin of the vehicle. The Bluetooth communication apparatus 11 may includes an antenna for transmission and reception which is provided on an instrument panel, for example. The Bluetooth communication apparatus 11 is connected to the operation screen generating apparatus 12.

The operation screen generating apparatus 12 includes a processing device 12a and an image rendering device 12b.

The processing device 12a is a main device which executes the processes described hereinafter. The processing device 12a may have as a hardware configuration a CPU; a ROM in which programs for implementing the functions (the processes shown in FIG. 2 and FIG. 4, for example) described hereinafter are stored; a readable/writable RAM in which calculation results, etc., are stored; timers; counters; an input interface; an output interface, etc. The image rendering device 12b renders an operation screen (described hereinafter) to be output to the display apparatus 14 according to an instruction from the processing device 12a. It is noted that the processing device 12a and the image rendering device 12b may be implemented by a control unit, such as a navigation ECU, or may be implemented by separate units, such as a navigation ECU and a display ECU, respectively. Further, the functions of the processing device 12a and the image rendering device 12b may be software-implemented when the CPU executes predetermined programs, or may be implemented by hardware resources such as logic circuits, etc., including an image rendering IC. The image rendering device 12b is connected to the display apparatus 14.

The display apparatus 14 is a touch panel display which is provided at an appropriate location in the cabin of the vehicle (the instrument panel, for example). The display apparatus 14 may be any type of a touch panel display such as a touch panel liquid crystal display, etc. On the display apparatus 14 the operation screen (described hereinafter) generated by the operation screen generating apparatus 12 is displayed.

A portable apparatus 20 is such as a mobile phone, a PDA, a portable audio, a DVD player, a digital camera, etc., and has a Bluetooth communication function. The portable apparatus 20 is brought in to the cabin of the vehicle by a user with its Bluetooth communication function being ON, for example. The portable apparatus 20 has a function (referred to as "portable apparatus possessing function", hereinafter) which may be implemented in cooperation with the on-vehicle information processing apparatus 10 via the Bluetooth communication function. The portable apparatus possessing function may vary, depending on a type or a model of the portable apparatus 20. Further, it is necessary for the on-vehicle information processing apparatus 10 to possess the corresponding function (referred to as "on-vehicle apparatus possessing function", hereinafter), in order to actually implement the portable apparatus possessing function in cooperation with the on-vehicle information processing apparatus 10.

The portable apparatus possessing function includes a hands-free function for performing hands-free telephone calls with an on-vehicle microphone and an on-vehicle speaker using a telephone function of the portable apparatus 20; a telephone directory function for utilizing or editing a telephone directory or an address directory in the on-vehicle information processing apparatus 10 (the display apparatus 14 with a user interface, for example), the telephone or address directory being registered in the portable apparatus 20; an audio/visual function for reproducing music or video data with an on-vehicle audio/visual apparatus, the music or video data being supplied from the portable apparatus 20; a e-mail function for viewing an e-mail with the on-vehicle information processing apparatus 10 (the display apparatus 14, for example), the e-mail being received by the portable apparatus 20, or transmitting an e-mail by the portable apparatus 20, the e-mail being made with the on-vehicle information processing apparatus 10 (the display apparatus 14 with a user interface, for example), etc.

The portable apparatus possessing functions are implemented by using Bluetooth profiles (also referred to as simply "profiles", hereinafter). Typically, the profiles are standard ones developed by a group "Bluetooth SIG"; however, the profiles may include an original profile incorporating a function unique to a maker. It is noted that the profiles are kinds of protocols which rule a technical specification, such as procedures or timings for transmission and reception of commands and data between the portable apparatus 20 and the on-vehicle information processing apparatus 10, definition of commands and variables, etc.

The standard profiles include a profile named HFP (Hands Free Profile) for implementing the hands-free function, a profile named PBAP (Phone Book Access Profile) for implementing the telephone directory function, a profile named AVP (Audio Visual Profile) for implementing the audio/visual function, a profile named MAP (Message Access Profile) for implementing the e-mail function, etc. It is noted that the AVP for implementing the audio/visual function consists of two profiles, A2DP (Advanced Audio Distribution Profile) and AVRCP (Audio Visual Remote Control Profile).

Thus, if the portable apparatus 20 has the hands-free function and the telephone directory function as the portable apparatus possessing functions, the portable apparatus 20 has the profile HFP and the profile PBAP stored therein. Further, if the portable apparatus 20 has the hands-free function, the telephone directory function and the audio/visual function as the portable apparatus possessing functions, the portable apparatus 20 has the profile HFP, the profile PBAP and the profile AVP stored therein. Similarly, the on-vehicle information processing apparatus 10 has the profiles stored therein which correspond to the on-vehicle apparatus possessing functions. In the on-vehicle information processing apparatus 10, all the profiles corresponding to the four profiles (HFP, MAP, AVP and MAP) may be stored so as to maximize the variety of the available functions with respect to the possible various portable apparatuses 20.

Figure 2:
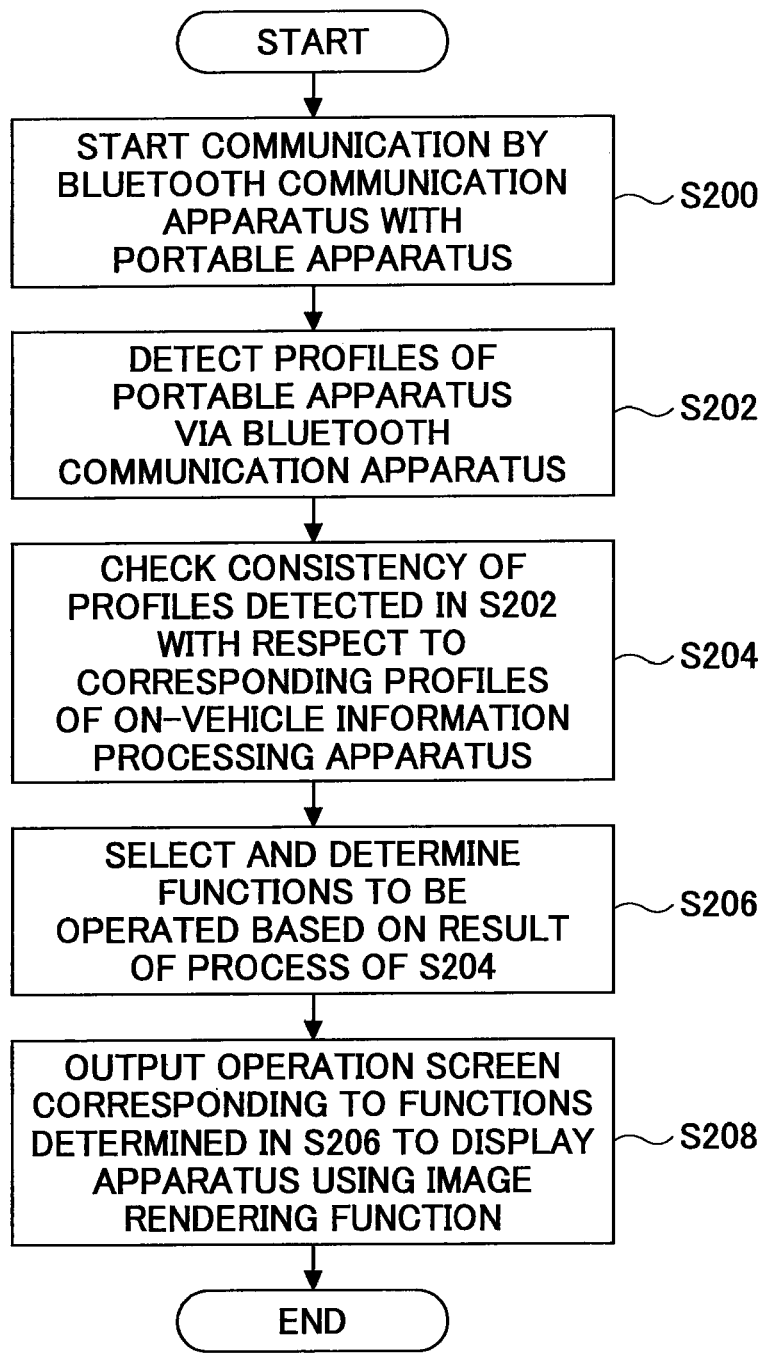
FIG. 2 is an example of a flowchart of a main process executed by the on-vehicle information processing apparatus 10 according to the embodiment.

FIG. 2 is an example of a flowchart of a main process executed by the on-vehicle information processing apparatus 10 according to the embodiment. The process routine shown in FIG. 2 starts when an engine of the vehicle is started (i.e., when an ignition switch is turned on), for example. Here, as an example, the on-vehicle information processing apparatus 10 has the profiles corresponding to the four profiles (HFP, MAP, AVP and MAP) stored therein.

In step 200, the Bluetooth communication is started by the Bluetooth communication apparatus 11 with the portable apparatus 20. It is noted that the Bluetooth communication is automatically started if the Bluetooth communication function is set in its ON state in the portable apparatus 20, but otherwise the Bluetooth communication may be started by the operation of the user, for example.

In step 202, the profile(s) possessed by the portable apparatus 20 is detected via the Bluetooth communication apparatus 11. The detection of the profile(s) is implemented by a link (connection) establishment process which is commonly performed between the Bluetooth communication apparatus 11 and the portable apparatus 20, for example.

In step 204, consistency of the profile(s) of the portable apparatus 20 detected in the step 202 with respect to the corresponding profiles of the on-vehicle information processing apparatus 10 is checked. For example, if the profile HFP and the profile PBAP are detected with respect to the portable apparatus 20 which is brought in this time, the two profiles HFP and PBAP are consistent with the profiles of the on-vehicle information processing apparatus 10. Further, if the profile HFP, the profile PBAP and the profile AVP are detected with respect to the portable apparatus 20 which is brought in this time, the three profiles HFP, PBAP and AVP are consistent with the profiles of the on-vehicle information processing apparatus 10. It is noted that if the on-vehicle information processing apparatus 10 has all the profiles corresponding to all the portable apparatus possessing functions which the portable apparatus 20 may possibly possess, the consistency of the profile(s) of the portable apparatus 20 detected in the step 202 may be confirmed without reservation (in other words, the process of step 204 may be substantially omitted).

In step 206, the processing device 12a selects and determines the function(s) to be operated on the on-vehicle information processing apparatus 10 based on the result of the process of step 204. For example, if the consistency of the profiles HFP and PBAP is confirmed, the hands-free function and the telephone directory function are selected and determined. Further, if the consistency of the profile HFP, the profile PBAP and the profile AVP is confirmed, the hands-free function, the telephone directory function and the audio/visual function are selected and determined.

In step 208, the image rendering device 12b renders (generates) the operation screen, which corresponds to the function(s) determined in the process of step 206, according to the instruction from the processing device 12a, and the operation screen is output on the display apparatus 14.

Figure 3A:
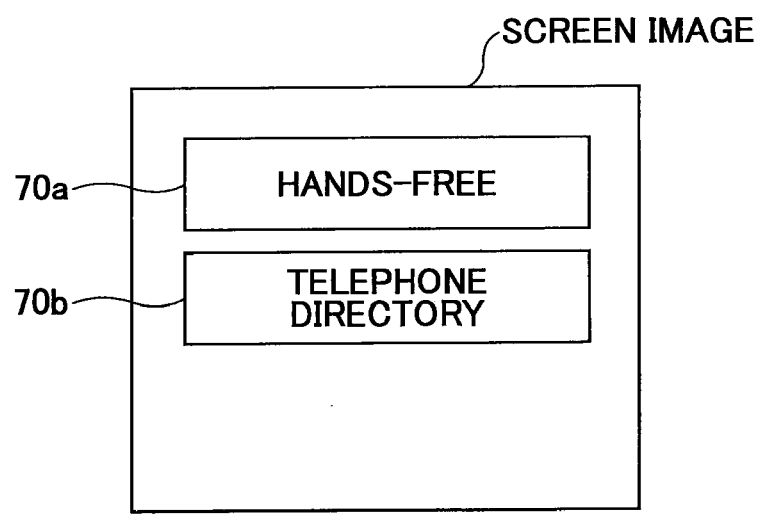
FIGS. 3A and 3B are diagrams for illustrating examples of a screen image of various operation screens.

For example, if the hands-free function and the telephone directory function are selected and determined as a result of the process of step 206, the operation screen, which has a touch switch 70a for operating the hands-free function and a touch switch 70b for operating the telephone directory function, is generated and output, as shown in FIG. 3A, for example. It is noted that the touch switch 70a for operating the hands-free function and the touch switch 70b for operating the telephone directory function may have letters ("hands-free" and "telephone directory" in the illustrated example) printed thereon, respectively, which indicate the respective functions. With this arrangement, the user can operate only the available functions, the hands-free function and the telephone directory function, and thus an operation itself for the function(s) other than the hands-free function and the telephone directory function, such as a non-available function (the audio/visual function, for example), cannot be performed. This prevents unnecessary confusion for the user. It is noted that the operation screen shown in FIG. 3A may be transferred to another operation screen for operating a narrower (descendant) function(s) when the user operates one of the touch switches 70a and 70b. For example, when the user who desires to do hands-free communication operates the touch switch 70a, the operation screen shown in FIG. 3A may be transferred to a lower operation screen for actually performing the hands-free communication, such as an operation screen including touch switches for inputting telephone numbers, a touch switch for calling, etc. Further, the number of the layers of the hierarchy may be arbitrary, and may be more than three.

Figure 3B:
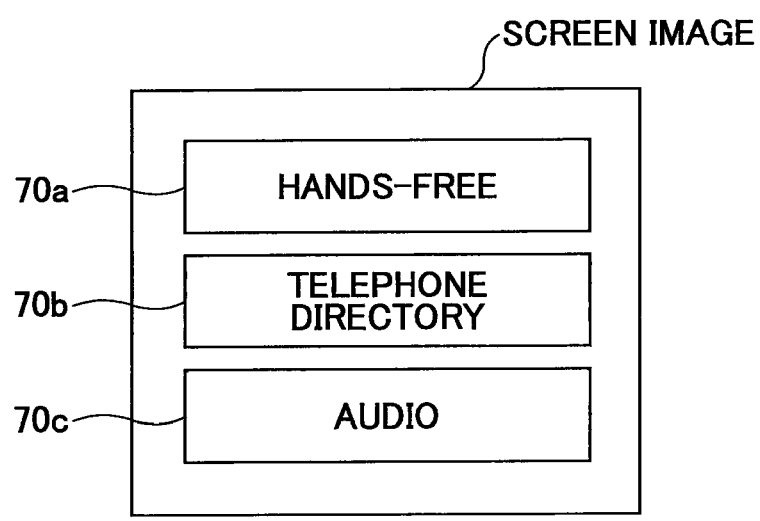

Similarly, if the hands-free function, the telephone directory function and audio/visual function are selected and determined as a result of the process of step 206, the operation screen, which has the touch switch 70a for operating the hands-free function, the touch switch 70b for operating the telephone directory function and a touch switch 70c for operating the audio/visual function, is generated and output, as shown in FIG. 3B, for example. It is noted that the touch switch 70c for operating the audio/visual function may have letters ("audio" in the illustrated example) printed thereon for indicating its function. With this arrangement, the user can operate only the available functions, the hands-free function, the telephone directory function and the audio/visual function, and thus an operation itself for the function(s) other than the hands-free function, the telephone directory function and the audio/visual function, such as a non-available function (the e-mail function, for example), cannot be performed. This prevents unnecessary confusions for the user. It is noted that the operation screen shown in FIG. 3B may be transferred to another operation screen for operating a narrower function(s) when the user operates one of the touch switches 70a, 70b and 70c. For example, when the user, who desires to listen to the music which is downloaded to the portable apparatus 20, operates the touch switch 70c, the operation screen shown in FIG. 3B may be transferred to a lower operation screen for performing the reproduction of the music, such as an operation screen including touch switches for instructing a play operation, a fast forward operation, a stop operation, etc. Further, the number of the layers of the hierarchy may be arbitrary, and may be more than three.

According to the process shown in FIG. 2, when the portable apparatus 20 of the user and the on-vehicle information processing apparatus 10 are connected via Bluetooth communication, the consistency between the functions (on-vehicle apparatus possessing functions) which the on-vehicle information processing apparatus 10 possesses and the portable apparatus possessing function(s) of the portable apparatus 20 brought in by the user is confirmed. As a result of this, it is possible to generate and output the operation screen with which only the operations of the function(s) available for the portable apparatus 20 brought in by the user are possible. With this arrangement, it is possible to prevent the problem as mentioned above, that is to say, the problem that the confusion for the user is caused by the operation screen with the operation switch for the function which in fact cannot be operated.

Figure 4:
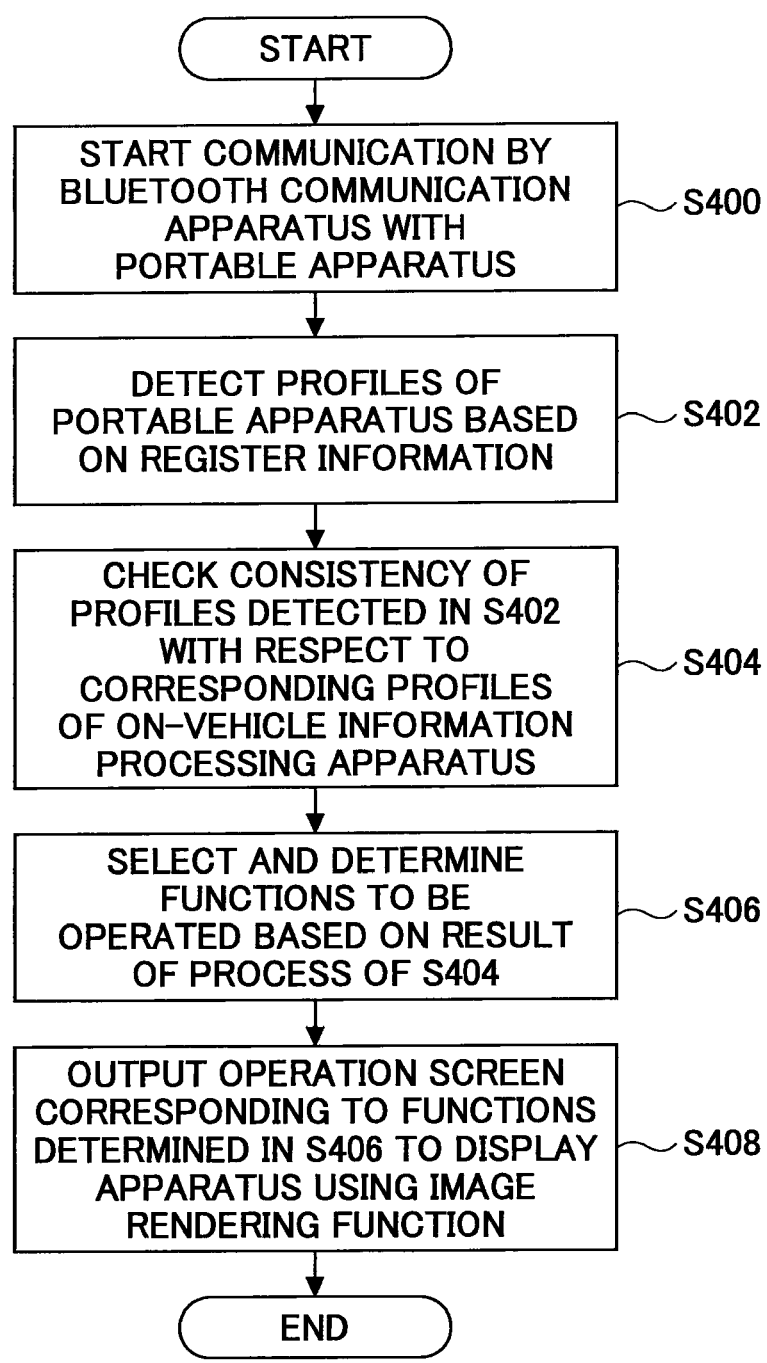
FIG. 4 is another example of a flowchart of a main process executed by the on-vehicle information processing apparatus 10 according to the embodiment.

FIG. 4 is another example of a flowchart of a main process executed by the on-vehicle information processing apparatus 10 according to the embodiment. The process routine shown in FIG. 4 starts when the engine of the vehicle is started as it the case with the process routine shown in FIG. 2, for example. Here, as an example, the on-vehicle information processing apparatus 10 has the profiles corresponding to the four profiles (HFP, MAP, AVP and MAP) stored therein.

The processes of step 400, 404, 406 and 408 other than the process of step 402 may be the same as the processes of step 200, 204, 206 and 208, respectively, and thus the description of the same processes is omitted.

In step 402, the processing device 12a detects the profile(s) of the portable apparatus 20 brought in the cabin of the vehicle based on register information of the portable apparatus 20 at the time of its initial registration. The register information is stored in a memory by the processing device 12a at the time of the initial registration. The register information includes information of the profiles (portable apparatus possessing functions) the processing device 20 possesses. The register information may include other information such as a model and a maker of the processing device 20, etc.

According to the process shown in FIG. 4, as is the case with the process shown in FIG. 2, when the portable apparatus 20 of the user and the on-vehicle information processing apparatus 10 is connected via Bluetooth communication, the consistency between the functions (on-vehicle apparatus possessing functions) which the on-vehicle information processing apparatus 10 possesses and the portable apparatus possessing function(s) of the portable apparatus 20 brought in by the user is confirmed based on the register information. As a result of this, it is possible to generate and output the operation screen with which only the operations of the function(s) available for the portable apparatus 20 brought in by the user are possible. With this arrangement, it is possible to prevent the problem that the confusion for the user is caused by the operation screen with the operation switch for the function which in fact cannot be operated.

The present invention is disclosed with reference to the preferred embodiments. However, it should be understood that the present invention is not limited to the above-described embodiments, and variations and modifications may be made without departing from the scope of the present invention.

For example, in the above embodiment, wireless communication based on Bluetooth is used; however, the present invention can be applied to a configuration using other wireless communication techniques such as WiMAX (Worldwide Interoperability for Microwave Access), for example. Further, the present invention is not limited to the wireless communication based configuration and can be applied to a configuration in which the portable apparatus 20 and the on-vehicle information processing apparatus 10 is connected via a wired communication line.

Further, in the above embodiment, as shown in FIG. 3A and FIG. 3B, the operation screen in which the non-available function(s) is not displayed is generated and output; however, the present invention is not limited to the configuration. For example, the operation screen may be generated and output in which the non-available function(s) is displayed in such a manner that the non-available function(s) is not selectable (in a form of a deactivated touch switch, for example).

Further, in the above embodiment, only the operation switches for the functions which can be implemented in cooperation with the portable apparatus 20 are set in the operation screen; however, operation switches for functions which are not relevant to the portable apparatus 20, that is to say, operation switches for functions (functions of the navigation system, air conditioner setting functions, for example) which can be implemented by only the on-vehicle information processing apparatus 10 may be set in the operation screen. In this case, the operation switches for the functions which are not relevant to the portable apparatus 20 may always be set (displayed) regardless of the connected portable apparatus 20. Further, other image such as a map of the navigation system or a television, etc., may be displayed on the display apparatus 12 under a situation where the portable apparatus 20 is not connected.

Further, in the above embodiment, the display apparatus 14 is described as a touch panel display apparatus in which the touch operations on the displayed operation screen are possible; however, the display apparatus 14 may be an ordinary display apparatus which is not a touch panel type. In this case, the display apparatus 14 may implement the display and input functions in cooperation with a separate switch operation apparatus. For example, the display apparatus 14 displays the operation screen and the operations of the operation screen may be implemented by using the separate switch operation apparatus, such as a remote controller, or a touch panel switch disposed at a remote location with respect the display apparatus 14.

The invention claimed is:

1. An on-vehicle information processing apparatus for implementing various functions in cooperation with a portable apparatus connected thereto in a cabin of a vehicle, said on-vehicle information processing apparatus comprising:
a communication device configured to communicate with the portable apparatus; and
a screen generating device configured to generate an operation screen for the functions which are implemented in cooperation with the portable apparatus,
wherein the operation screen is displayed on the on-vehicle information processing apparatus,
wherein the screen generating device is configured to identify the functions which are implemented in cooperation with said portable apparatus connected thereto via the communication device, among a plurality of functions which are implemented in cooperation with portable apparatuses, based on information of the connected portable apparatus, and automatically generate the operation screen which varies according to the identified available function or functions,
wherein at least one of the plurality of functions is different than another of the plurality of functions, and
wherein the operation screen includes one or more touch switches that correspond to the identified available function or functions that are made visible, and the operation screen does not display touch switches for unavailable functions.

2. The on-vehicle information processing apparatus claimed in claim 1, wherein the screen generating device is configured to generate the operation screen with which only the identified available function or functions can be operated.

3. The on-vehicle information processing apparatus claimed in claim 2, wherein the screen generating device is configured to generate the operation screen in which only the identified available function or functions are displayed.

4. The on-vehicle information processing apparatus claimed in claim 1, wherein the communication device is a wireless communication device based on Bluetooth.

5. The on-vehicle information processing apparatus claimed in claim 1, wherein the screen generating device is configured to identify the available function or functions by detecting a profile or profiles the portable apparatus has, said portable apparatus being connected thereto via the communication device and having a Bluetooth communication function.

6. The on-vehicle information processing apparatus claimed in claim 1, wherein the plurality of functions which can be implemented in cooperation with the portable apparatus include at least one of: a hands-free function for performing a hands-free telephone call with an on-vehicle microphone and an on-vehicle speaker using a telephone function of the portable apparatus; a telephone directory function for utilizing or editing a telephone directory or an address directory in the on-vehicle information processing apparatus, said telephone or address directory being registered in the portable apparatus; an audio/visual function for reproducing music or video data with an on-vehicle audio/visual apparatus, said music or video data being supplied from the portable apparatus; and an e-mail function for viewing an e-mail with the on-vehicle information processing apparatus, said e-mail being received by the portable apparatus, or transmitting an e-mail by the portable apparatus, said e-mail being made with the on-vehicle information processing apparatus.

7. The on-vehicle information processing apparatus claimed in claim 1, further comprising a display apparatus configured to display the operation screen generated by the screen generating device.

8. An operation screen generating method for implementing various functions with a portable apparatus connected to an on-vehicle information processing apparatus, said method comprising:
- detecting a profile or profiles which the portable apparatus has, said portable apparatus being connected to the on-vehicle information processing apparatus via the communication device;
- confirming consistency between the profile or profiles of the connected portable apparatus and various profiles which the on-vehicle information processing apparatus has; and
- automatically generating an operation screen with which only the function or functions corresponding to the profile or profiles for which the consistency is verified, among a plurality of functions corresponding to the profiles which the on-vehicle information processing apparatus has, can be operated,
- wherein at least one of the plurality of functions is different than another of the plurality of functions, and
- wherein the operation screen includes one or more touch switches that correspond to the identified available function or functions that are made visible, and the operation screen does not display touch switches for unavailable functions.

9. A non-transitory computer-readable storage medium, said computer-readable storage medium being configured to make a computer execute the method claimed in claim 8 when executed on the computer.

* * * * *